Sept. 15, 1942.　　　　　C. J. MERRIAM　　　　　2,295,745
CONTROLLING UNIFORMITY OF VACUUM DRYING WITH SUPERHEATED STEAM
Filed March 29, 1940
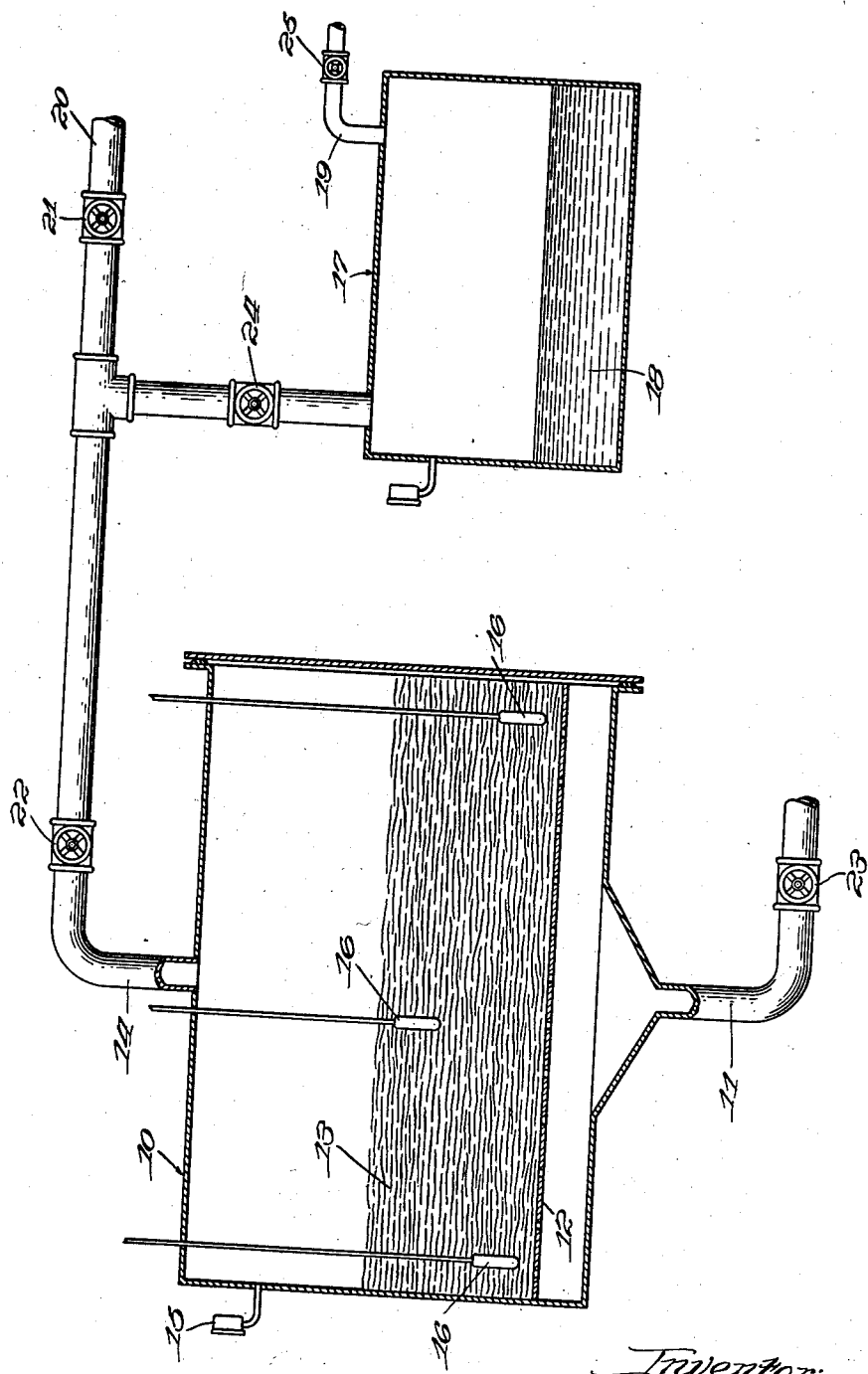
Inventor:
Charles J. Merriam.
By Britton, Wiles, Davies, Hirsch & Dawson.
Attys.

Patented Sept. 15, 1942

2,295,745

UNITED STATES PATENT OFFICE 2,295,745

CONTROLLING UNIFORMITY OF VACUUM DRYING WITH SUPERHEATED STEAM

Charles J. Merriam, Winnetka, Ill., assignor to The Guardite Corporation, a corporation of Illinois Application March 29, 1940, Serial No. 326,722

2 Claims. (Cl. 34—15)

This invention relates to a process for controlling uniformity of drying under vacuum with superheated steam.

In the present process the product to be dried is freed from non-condensible gas and is then treated with superheated steam, preferably without exceeding atmospheric pressure. In many such processes it is desirable that the steam be continuously introduced in a stream. The result of such introduction is to cause greater drying in the object at the point nearest the place of introduction of the steam, and while this difficulty may largely be overcome by the use of manifolds, progressive inlets, or recirculation, there is still a tendency for the drying in some such instances to be non-uniform.

It has now been discovered that this difficulty may be very simply overcome by the control of the temperature of the superheated steam.

In my co-pending application, Serial No. 326,721, filed March 29, 1940, I have disclosed a method of controlling the final moisture content obtained in such drying by correlating the final temperature and pressure conditions of the product.

However, if the process is carried out by the introduction of superheated steam in a stream through a large mass of material, the temperature throughout the mass may not be equal and that exposed first to the steam may reach a temperature considerably above the desired point before other regions have reached the desired final temperature.

It has now been discovered that this difficulty may be completely overcome by regulating the degree of superheat of the steam so that after its pressure has been reduced to that prevailing in the chamber, its final temperature will be that of the product undergoing treatment. That is, with a pressure of 7.5 inches and a desired final temperature of 200° F., the superheated steam employed, at least for finishing the operation, should be 200° F. after introduction to the vacuum. This is generally best accomplished by producing saturated steam under that pressure which, when reduced to the vacuum prevailing in the chamber, will result in the desired temperature. This may readily be found from any Moliere diagram.

Instead of using superheated steam so adjusted as to temperature through the whole process, the product may be dried as rapidly as possible and as uniformly as possible by more highly superheated steam and then be brought to its final moisture content by a finishing application of the adjusted superheated steam. The latter will act to increase the moisture content of any product which has temporarily become overdried.

The invention is illustrated diagrammatically in the drawing in which 10 represents a vacuum container, 11 represents a line leading to evacuating means which are not shown, 12 represents a foraminous plate or screen adapted to maintain a heavy layer of wet rayon or other material indicated by 13, 14 represents a line for supplying superheated steam, 15 represents a pressure gauge and 16 represents thermocouples distributed throughout the rayon. 17 represents a boiler containing water 18 and provided with a line 19 leading to a vacuum pump. The line 20 leads to an ordinary heating arrangement capable of producing superheated steam. In carrying out the process in the apparatus shown wet material such as rayon is placed on the plate 12 in a thick layer and a high vacuum is produced within the container 10 in order to remove the air. Thereafter the valves 21 and 22 are opened and valves 23 and 24 are closed and steam is introduced to the system through the lines 20 and 14 at a constant desired pressure while observing the temperature of the rayon by means of the thermocouples 16. The process is carried out until one of the thermocouples shows a temperature corresponding, under the pressure, to the desired final moisture content of the product or in the vicinity of that temperature. The valve 21 is then closed and the valve 25 opened. After the pressure in 17 has been reduced to a point slightly above that in the chamber 10 the valve 24 is opened and the valve 25 closed and steam is thereafter introduced through the line 14 from the boiler 17 at a temperature corresponding to the desired final temperature of the product. The pressure differences between the containers 10 and 17 are selected in such manner that the steam introduced will be superheated under these conditions.

During the admission of the superheated steam, the speed of the operation may be improved by recirculating steam from the line 11 to the boiler 17 either by means of a vacuum pump or its equivalent.

In my copending application, Serial No. 326,721, a method is disclosed for producing a given moisture content in a product of an unknown original moisture content. This was accomplished by bringing the temperature and pressure into correlation such as to produce a fixed predetermined moisture content.

It was known in the prior art that at any given temperature, pressure, and moisture content, a product had a given water vapor pressure. For example, it was known that a salt solution of a given concentration at a given temperature would exert a given vapor pressure of water. It was not appreciated, however, that if an atmosphere of steam were established and the temperature brought to any particular figure, under the predetermined pressure, the moisture content of the solution at that point would be known, or that this correlation of physical data can be used to predetermine a moisture content in a body having originally undetermined moisture content.

For example, the process of the present application depends upon the utilization of the relationship between water vapor pressure and temperature and moisture content of any given product. It is, of course, known that every hygroscopic product will exert a given water vapor pressure at a particular temperature. Applicant, however, was the first to realize that this known fact could be made use of to control drying either under a vacuum or not. If a substance will exert a 6" vapor pressure at 140° F. when containing 10% of water, applicant realized that if the substance where held under 6" of steam pressure and the temperature gradually increased to 140° F., that when it reached that temperature its moisture content would be 10% regardless of how much moisture the product had at the beginning of the treatment.

When stated in this simple form the above proposition appears to be a converse hypothesis which should have been easily ascertainable by the art. Nevertheless, it was never grasped by anyone skilled in the art. Probably this is because engineers have been confused by the differing amounts of heat input required for different amounts of moisture removed, and by the different amounts of heat input required where the objects have different starting temperatures. It is also confusing because the proposition is true only where the product is allowed to be at equilibrium under these conditions, and where the atmosphere is one exclusively of steam.

Let us assume the case of a product which has a 6" vapor pressure at 140° F. when containing 10% of moisture. Let us also assume that the product contains an indeterminate amount of moisture greater than 10%, and has a lower temperature than 140° F. The product is treated to remove all of the air and establish an atmosphere of steam. This likewise is an important part of the process because, if any air is present, all of the calculations are thrown off. In order to remove the air it is preferred to follow the process of the patent of applicant and Russell Wiles, 2,080,179. During that process the pressure on the product is lowered far below 6" and its temperature will also be reduced. Thereafter a steam pressure is established on the product of 6". Inasmuch as the product has more than 10% of moisture, it can support more than 6" of pressure at 140% of moisture, it can support more than 6" of pressure at 140° F. and, therefore, its temperature in the beginning will be below 140° F. and it will rise only as the product dries. The heat for drying may be introduced in a number of ways and preferably by superheated steam. The introduced heat goes mostly toward removing moisture and the temperature rise of the product is very slow, but at each stage the temperature of the product will correspond to a given moisture content of the product under the particular pressure. By stopping at 140° F., this content will be 10%. If the process were stopped at 135° F., it might be 15%. Conversely, at 150° F., it might be 7%.

The present process applies the same principle to a bulk of material in which it is impracticable to obtain equality of temperature throughout the mass because of the ordinary effects of steam flow. That is, using steam at a higher temperature than the product, that part of the product which the steam first contacts will have a higher temperature than that which it contacts later. In the present process the bulk of material is brought to a general average moisture content approximating that finally desired and then superheated steam at the desired final temperature is circulated with the result that it dries the part of the product which has not been sufficiently dried and moistens that part of the product which has been overdried.

The foregoing detailed description has been given for clearness of understanding only, and no unnecessary limitations should be understood therefrom.

What I claim as new, and desire to secure by Letters Patent is:

1. The method of drying a hydroscopic product in bulk which comprises subjecting the product to a subatmospheric pressure of an atmosphere of superheated steam, passing superheated steam at a selected pressure and temperature through the mass of product, the steam having a temperature in excess of that temperature of the product, until the temperature of the product has reached a predetermined value indicating that the vapor pressure of the moisture in the product at that area is in equilibrium with the steam pressure and that the product contains a desired moisture content, and then passing superheated steam at a different temperature and at the same pressure through the product until the temperature throughout the product substantially equals the steam temperature, indicating that the vapor pressure of the moisture throughout the mass of the product is in equilibrium with the steam pressure at that temperature, and that the product contains the desired moisture content.

2. The method as set forth in claim 1 in which the product is rayon.

CHARLES J. MERRIAM.